(12) United States Patent
Sheahan, Jr. et al.

(10) Patent No.: US 7,898,120 B2
(45) Date of Patent: Mar. 1, 2011

(54) LINEAR-ROTARY ACTUATORS AND ACTUATOR SYSTEMS

(75) Inventors: James J. Sheahan, Jr., Florissant, MO (US); Charles E. Morris, Des Peres, MO (US); Paul Kersens, CreveCoeur, MO (US)

(73) Assignee: The Boeing Company, Chicago, IL (US)

( * ) Notice: Subject to any disclaimer, the term of this patent is extended or adjusted under 35 U.S.C. 154(b) by 572 days.

(21) Appl. No.: 11/756,462

(22) Filed: May 31, 2007

(65) Prior Publication Data

US 2008/0297074 A1    Dec. 4, 2008

(51) Int. Cl.
    *H02K 41/02* (2006.01)
(52) U.S. Cl. ............ 310/12.14; 310/112; 310/114
(58) Field of Classification Search .......... 310/49.12, 310/90.5, 268, 112, 12.14, 12.15, 114
    See application file for complete search history.

(56) References Cited

U.S. PATENT DOCUMENTS

| | | | | |
|---|---|---|---|---|
| 3,394,295 | A | * | 7/1968 | Cory ................. 318/115 |
| 4,607,197 | A | * | 8/1986 | Conrad ............... 318/116 |
| 5,045,741 | A | * | 9/1991 | Dvorsky .............. 310/209 |
| 5,093,596 | A | * | 3/1992 | Hammer .............. 310/191 |
| 5,627,418 | A | * | 5/1997 | Satomi et al. ........ 310/12.14 |
| 5,982,053 | A | * | 11/1999 | Chitayat ............. 310/12.21 |
| 6,798,087 | B1 | * | 9/2004 | Swift ................ 310/12.26 |
| 2001/0043016 | A1 | * | 11/2001 | Chun et al. ........... 310/12 |
| 2008/0289440 | A1 | * | 11/2008 | Denk et al. ........... 74/89.34 |
| 2008/0297074 | A1 | * | 12/2008 | Sheahen et al. ........ 318/115 |

FOREIGN PATENT DOCUMENTS

DE    2906404 A1    8/1980
KR    2001-0064185    *    7/2001

OTHER PUBLICATIONS

Machine Translation of DE 29 06 404 "Electric Motor", Siegfried Kofink, Aug. 28, 1980.*
Machine Translation of KR 2001-0064185, "Rotary Linear Motor", Shin, HyunJung and Kim, YoungKwan, Jul. 9, 2001.*
Abstract KR 2001-0064185, "Rotary Linear Motor", Shin, HyunJung and Kim, YoungKwan, Jul. 9, 2001.*
Manual Translation of DE 2 906 404, "Electric Motor", Siegfreied Kofink, Aug. 28, 1980.*
PCT International Search Report and Written Opinion of the International Searching Authority.

* cited by examiner

*Primary Examiner*—Karl I Tamai
(74) *Attorney, Agent, or Firm*—Hope Baldauff Hartman, LLC

(57) ABSTRACT

In an embodiment, an actuator includes a plurality of stator windings adapted to produce a first stator magnetic field that translates along a stator axis, and to produce a second stator magnetic field that rotates around the stator axis. In addition, the actuator includes a rotor, coupled to a shaft, and positioned within a central stator channel. The rotor is adapted to produce a first rotor magnetic field that translates along a shaft axis and to produce a second rotor magnetic field that rotates around the shaft axis. An actuator system includes an actuator and an actuator controller unit, which is adapted to produce actuator inputs. An embodiment of a method for controlling the actuator includes providing actuator inputs to produce a translating magnetic field in the stator, a translating magnetic field in the rotor, a rotating magnetic field in the stator, and a rotating magnetic field in the rotor.

13 Claims, 8 Drawing Sheets

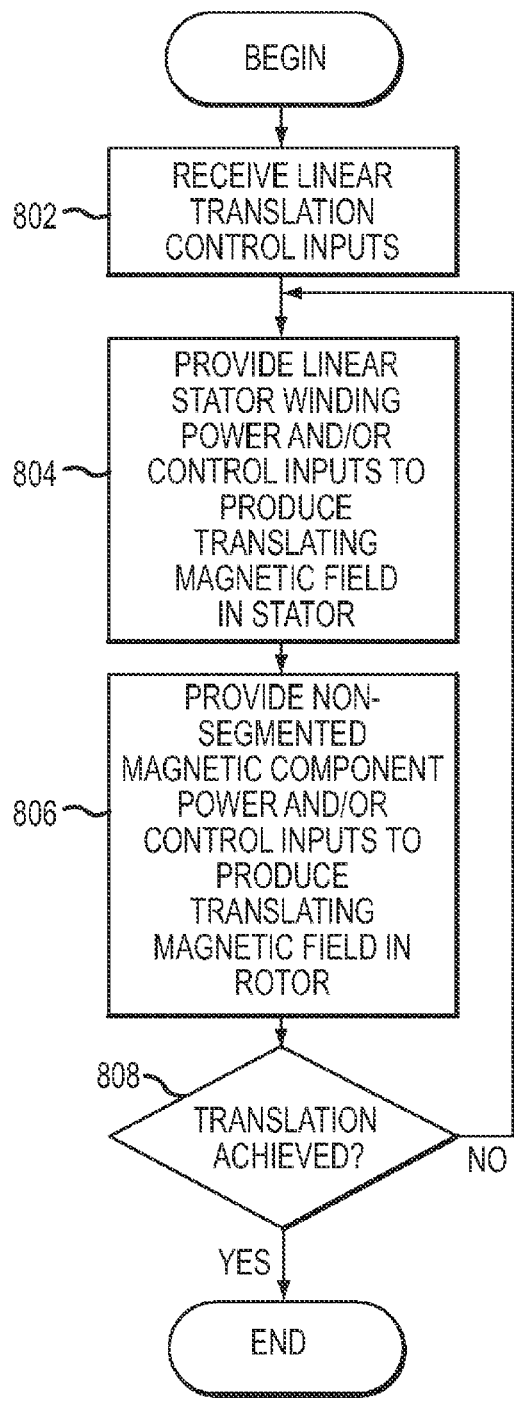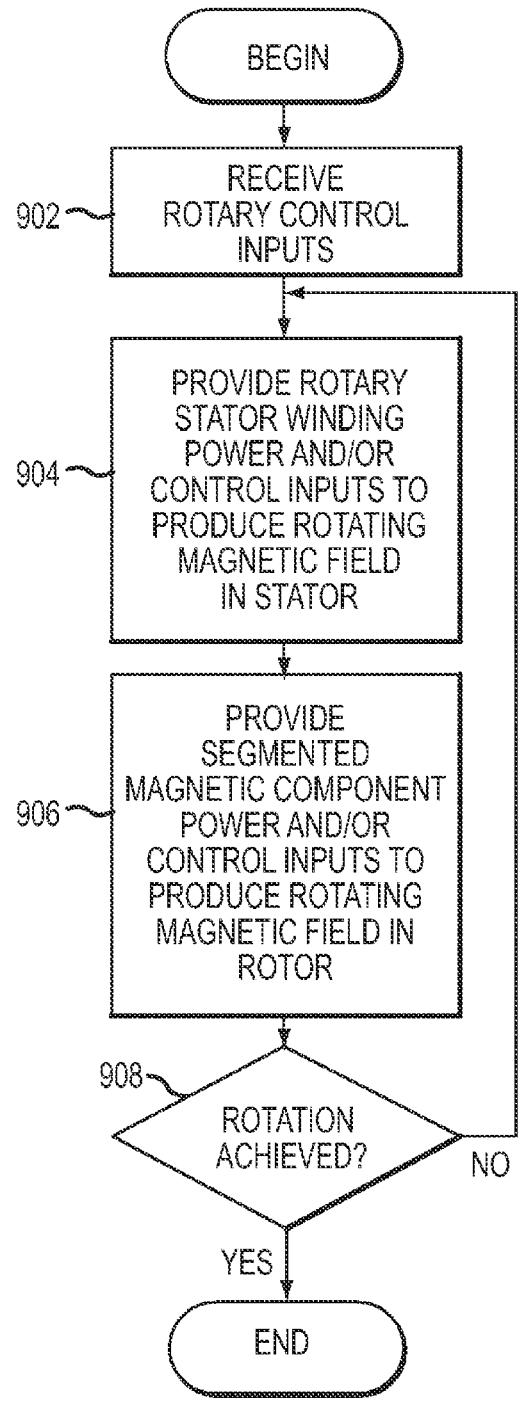
FIG.8
FIG.9

LINEAR-ROTARY ACTUATORS AND ACTUATOR SYSTEMS

TECHNICAL FIELD

Embodiments described herein generally relate to electromagnetic actuators, actuator systems, and methods of operation therefor, and more particularly to electromagnetic actuators adapted to provide linear and rotary movement of an actuator shaft.

BACKGROUND

Some systems, such as an aircraft flight surface control system, may include one or more components or surfaces that are rotated with respect to relatively fixed portions of the system. In such systems, a rotary drive motor may be implemented to impart a rotational force on the component about an axis of rotation.

In some cases, a rotating component may be maintained in a stowed position using a locking mechanism. The locking mechanism may include an engagement member and a linear actuator. The linear actuator may cause the engagement member to extend and couple the rotating component to the relatively fixed portion of the system, thus locking the rotating component in place. In addition, the linear actuator may cause the engagement member to retract, thus unlocking the rotating component, and enabling the rotary drive motor to rotate the rotating component, with respect to the relatively fixed portion of the system.

A linear actuator and a rotary motor combination may be sufficient to provide the dual functionality of component locking/unlocking and rotation in a system that requires such functionality. However, systems for providing this dual functionality have certain disadvantages. For example, the combination of the linear actuator and the rotary motor may be fairly heavy. Accordingly, in systems in which relatively low weight is an important system specification (e.g., aircraft systems), system designers may try to reduce weight in other areas (e.g., aircraft structure) in order to accommodate the weight of the linear actuator and the rotary motor. In addition, a linear actuator and a rotary motor may take significant volume, which may be undesirable in compact systems or systems in which space is at a premium. For at least these reasons, it is desirable to provide improved systems, apparatus, and methods capable of providing engagement/disengagement between a rotating system component and a relatively fixed portion of a system, while being further capable of imparting rotational forces to the component. Further, it is desirable to provide these systems, apparatus, and methods at potentially reduced weight, volume, part count, and/or cost when compared to traditional systems. Other desirable features and characteristics of embodiments of the inventive subject matter will become apparent from the subsequent detailed description and the appended claims, taken in conjunction with the accompanying drawings and the foregoing technical field and background.

BRIEF DESCRIPTION OF THE DRAWINGS

Various embodiments will hereinafter be described in conjunction with the following drawing figures, wherein like numerals denote like elements.

FIG. 8 illustrates a flowchart of a method for achieving linear translation of a rotor and shaft, in accordance with an example embodiment;

FIG. 9 illustrates a flowchart of a method for achieving rotation of a rotor and shaft, in accordance with an example embodiment;

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background or the following detailed description.

Figure 1:
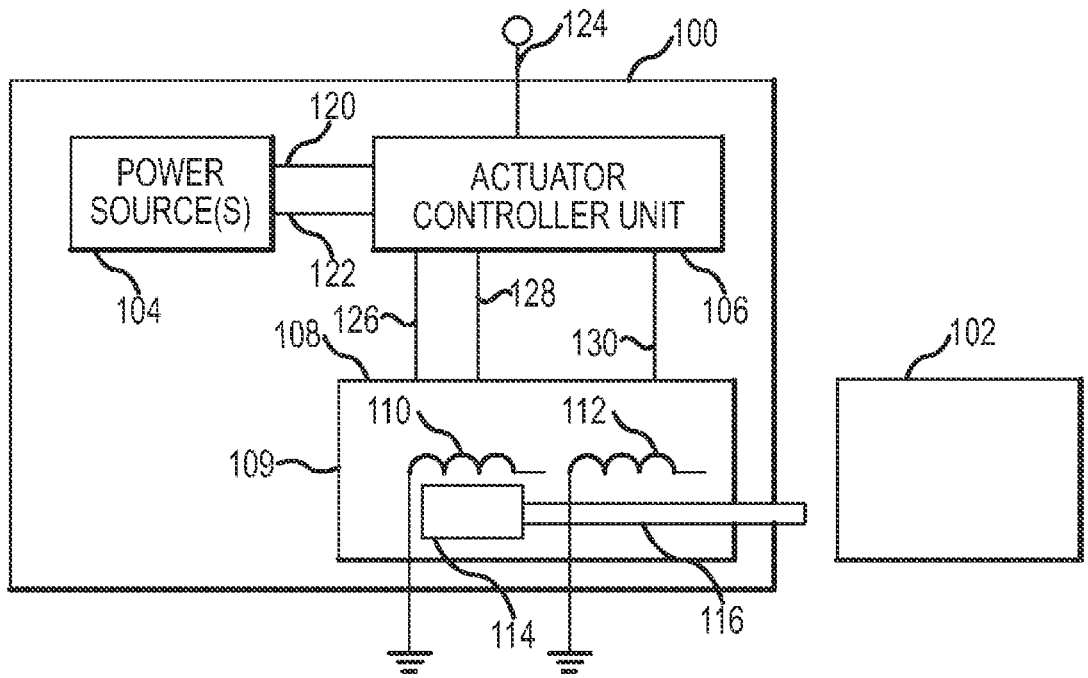
FIG. 1 illustrates a simplified block diagram of an actuator system in proximity to and disengaged from a separate mechanism, in accordance with an example embodiment of the inventive subject matter.

FIG. 1 illustrates a simplified block diagram of an actuator system 100 in proximity to and disengaged from a separate component 102, in accordance with an example embodiment of the inventive subject matter. Actuator 100 includes at least one power source 104, at least one actuator controller unit 106, and an actuator 108, in an embodiment. The actuator 108 includes a stator 109, which houses a plurality of linear stator windings (represented by coil 110) and at least one rotary stator winding (represented by coil 112). Actuator 108 also includes a rotor 114 and a shaft 116, in an embodiment. As will be described in more detail below, component 102 is adapted to engage with shaft 116, when shaft 116 is in an extended position, and to be rotated by shaft 116, when shaft 116 is rotated.

The at least one power source 104 may include at least one alternating current (AC) and/or direct current (DC) power source. For example, in an embodiment, the at least one power source 104 includes a DC power source (e.g., 270 Volts DC or another DC voltage) and an AC power source (e.g., three-phase 115 V AC or another AC voltage). The DC power source provides a DC power input 120 to the at least one actuator controller unit 106, and the AC power source provides an AC power input 122 to the at least one actuator controller unit 106.

The at least one actuator controller unit 106 is adapted to receive system control inputs 124 from a control input source (e.g., an aircraft flight control system or other control system, not illustrated), and in accordance with the system control inputs 124, to produce actuator inputs, which may include power inputs 126 and control inputs 128, in an embodiment. In an alternate embodiment, the at least one actuator controller unit 106 may be adapted to receive other inputs (e.g., variable voltage inputs) that the at least one actuator controller unit 106 may interpret to produce power inputs 126 and/or control inputs 128. In addition, in an embodiment, the at least one actuator controller unit 106 is adapted to receive feedback signals 130 from actuator 108, and based on evaluations of the feedback signals 130, to produce additional power inputs 126 and/or control inputs 128. The at least one actuator controller unit 106 may include, for example, one or more general purpose or special purpose processors, rectifiers, alternators, connectors, and/or other circuitry adapted to perform the above-described functions.

The system control inputs 124 may include, for example, commands to cause actuator 108 to rotate shaft 116 and/or to linearly translate shaft 116. As used herein, the term "translate" means to change from a first position to a second position along an axis. The system control inputs 124 may specify angles and/or rates of rotation, and/or may specify distances and/or rates of linear translation. When an actuator controller unit 106 receives a system control input 124, the actuator controller unit 106 converts the input into one or more power inputs 126 and/or control inputs 128, which may produce a result indicated by the system control input 124. The feedback signals 130 may indicate, for example, actual angles of rotation, rates of rotation, linear translation distances, and/or rates of rotation produced on the rotor 114 and shaft 116 by actuator 108. An actuator controller unit 106 may evaluate the feedback signals 130 to determine whether the result indicated by the control input 124 has been achieved, and based on the evaluation, to produce additional power inputs 126 and/or actuator control inputs 128 to cause actuator 108 to continue, discontinue, or alter the rates of rotation and/or linear translation being produced on the rotor 114 and shaft 116.

As mentioned above, actuator 108 includes a stator 109, which houses a plurality of linear stator windings (represented by coil 110) and at least one rotary stator winding (represented by coil 112), in an embodiment. As will be described in detail later, the linear stator windings 110 and the rotary stator winding 112 may be configured from different apparatus from each other, and which produce electromagnetic fields to induce linear or rotational forces on rotor 114 and shaft 116. In an alternate embodiment, also described later, the linear stator windings 110 and the rotary stator winding 112 may be formed from substantially similar apparatus, which may be electronically controlled to produce magnetic fields to induce linear or rotational forces. In other words, a group of windings having a particular arrangement may be electronically controlled in one manner to produce a magnetic field to induce linear force, and may be electronically controlled in a different manner to produce a magnetic field to induce a rotational force, in an embodiment.

Actuator 108 further includes a rotor 114 coupled to a shaft 116, which are at least partially positioned within stator 109. Actuator 108 may include various other components, as well, such as an outer casing, a lubricant bath, for example. For purposes of ease of explanation, such other components are not discussed herein. Rotor 114 includes a plurality of magnetic components, some of which are adapted to interact with the rotary stator winding 112 to provide rotation of shaft 116 about a rotor axis, and some of which are adapted to interact with the linear stator windings 110 to provide linear translation of shaft 116 along the rotor axis. Accordingly, rotor 114 may be referred to herein as being a "combined" rotor or a "linear-rotary" rotor. Further, rotor 114 and shaft 116 are positioned within central openings that are defined by (e.g., surrounded by) both the rotary stator winding 112 and the linear stator windings 110, and thus rotor 114 and shaft 116 are "common" to the rotary stator winding 112 and the linear stator windings 110, and the central openings are substantially "aligned" along the shaft axis. Because the central openings of the rotary stator winding 112 and the linear stator windings 110 are aligned in this manner, the rotary and linear stator windings 112, 110 may be referred to herein as forming "aligned, linear-rotary stator windings." Further, because actuator 108 is adapted to produce both rotary motion and linear translation of rotor 114 and shaft 116, actuator 108 may be referred to herein as an "aligned, linear-rotary electromagnetic actuator."

Shaft 116 and rotor 114 are shown in a first position, in FIG. 1, in which rotor 114 is at least partially positioned within the central opening defined by linear stator windings 110. Accordingly, rotor 114 and linear stator windings 110 are in "magnetic proximity" to one another. As used herein, the term "magnetic proximity" means that two or more elements (e.g., rotor 114 and linear stator windings 110 or rotary stator winding 112) are in physical proximity to one another, such that magnetic fields between the two or more elements are sufficient to produce a physical force that causes at least one of the elements (e.g., rotor 114) to move (e.g., linearly or rotationally).

During operation, actuator controller unit 106 may receive one or more system control inputs 124 specifying that shaft 116 should be linearly translated. Upon receipt of such an input 124, actuator controller unit 106 may produce power inputs 126 and/or control inputs 128 that are received by actuator 108 and linear stator windings 110. The corresponding currents produced through linear stator windings 110 may produce magnetic fields (not illustrated) sufficient to interact with magnetic fields produced by the magnetic components of rotor 114 to produce a linear force on rotor 114 and shaft 116. The linear force may cause rotor 114 and shaft 116 to move toward component 102, and may further result in engagement between shaft 116 and component 102. For example, the linear translation may result in engagement between a shaft engagement mechanism (e.g., at a distal end of shaft 116) and a complementary engagement mechanism of component 102.

Figure 2:
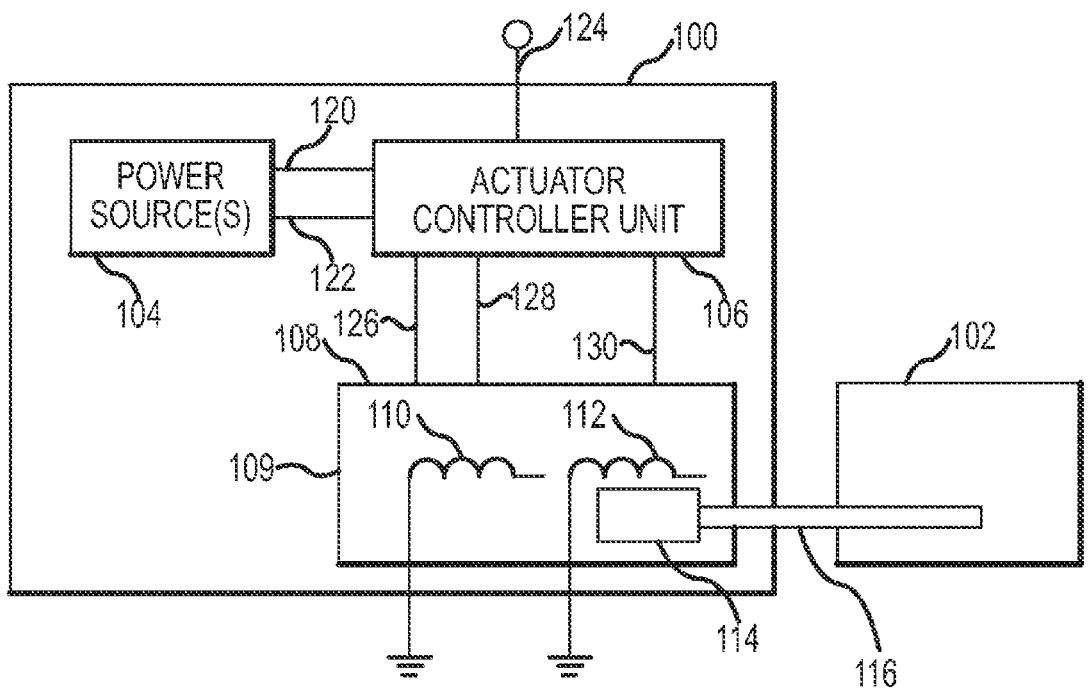
FIG. 2 illustrates a simplified block diagram of the actuator system of FIG. 1, with a shaft engaged with the mechanism, in accordance with an example embodiment.

FIG. 2 illustrates a simplified block diagram of the actuator system of FIG. 1, with shaft 116 engaged with component 102, in accordance with an example embodiment. Shaft 116 and rotor 114 are shown in a second position, in FIG. 2, in which rotor 114 is at least partially positioned within the central opening defined by rotary stator winding 112. Accordingly, rotor 114 and rotary stator winding 112 are in magnetic proximity to one another.

During operation, actuator controller unit 106 may receive one or more system control inputs 124 specifying that shaft 116 should be rotated. Upon receipt of such an input 124, actuator controller unit 106 may produce power inputs 126 and/or control inputs 128 that are received by actuator 108 and rotary stator winding 112. The corresponding currents produced through rotary stator winding 112 may produce magnetic fields sufficient to interact with magnetic fields produced by the magnetic components of rotor 114 to produce a rotational force on rotor 114 and shaft 116. The rotational force may cause rotor 114 and shaft 116 to rotate, and through the complementary engagement mechanisms of shaft 116 and component 102, may result in rotation of portions of component 102. In various embodiments, component 102 may be a component selected from a group of components that includes a surface, a flight control surface, a rudder, a door, a gate, a gear, fan blade, a turbine, a mixer, a drill bit, a driver, and other components adapted to be engaged with and rotated.

The actuator system 100 described above is configured to produce a linear force on rotor 114 and shaft 116 when rotor 114 and shaft 116 are proximate to a first position (e.g., when shaft 116 is retracted, with respect to actuator 108). This linear force results in extension of shaft 116 with respect to actuator 108. When extended into a second position (e.g., as shown in FIG. 2), the actuator system 100 is further configured to produce a rotational force on rotor 114 and shaft 116. In another embodiment, an actuator system may be configured to produce a rotational force on a rotor and shaft when the shaft is retracted, with respect to the actuator. In still another embodiment, an actuator system may be configured simultaneously to produce linear translation and rotation of the rotor and shaft.

Figure 3:
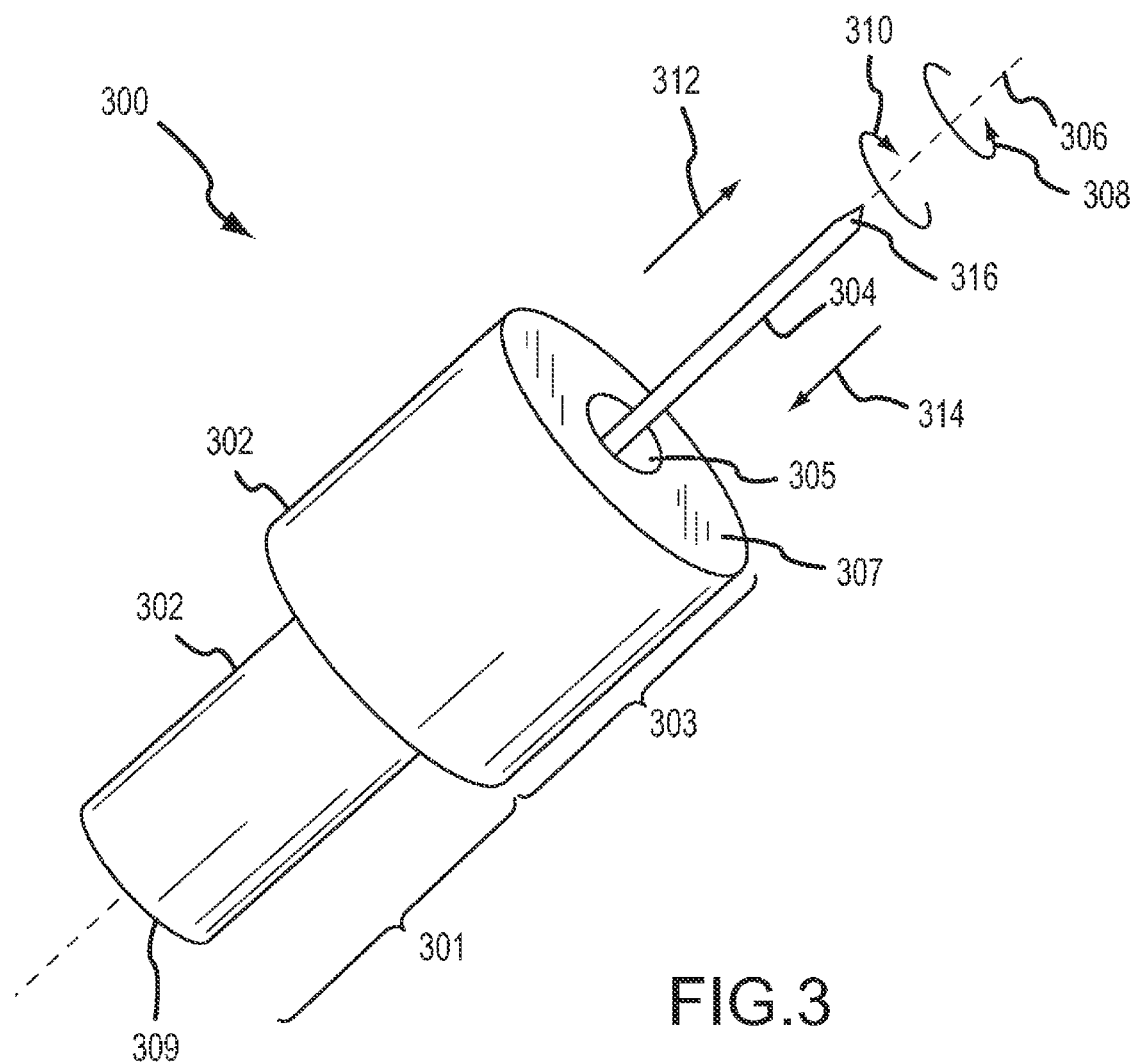
FIG. 3 illustrates an exterior, perspective view of aligned, linear-rotary electromagnetic actuator, in accordance with an example embodiment.

FIG. 3 illustrates an exterior, perspective view of an aligned, linear-rotary electromagnetic actuator 300, in accordance with an example embodiment. The aligned, linear-rotary electromagnetic actuator 300 includes aligned, linear-rotary stator windings and a combined rotor (hidden in FIG. 3), both contained within an outer casing 302. In an embodiment, linear stator windings (hidden in FIG. 3) may be positioned in a linear stator portion 301 of outer casing 302, and rotary stator winding (also hidden in FIG. 3) may be positioned in a rotary stator portion 303 of outer casing 302. In the illustrated embodiment, the linear stator portion 301 is adjacent to the rotary stator portion 303.

Actuator 300 also includes a shaft 304, which is coupled to the rotor, and which extends out of an aperture 305 of actuator 300. Shaft 304 is disposed partially within and partially outside of outer casing 302. In an embodiment, the aperture 305 through which shaft 304 extends is proximate to an end 307 of the rotary stator portion 303 of outer casing 302. In an alternate embodiment, the aperture through which shaft 304 extends is proximate to an end 307 of the linear stator portion 301 of outer casing 302.

Shaft 304 is an elongated structure, in an embodiment (e.g., a structure having a length substantially greater, in dimension, than a width or diameter). A shaft axis 306 is defined as an axis substantially through the center of shaft 304 and extending along and beyond the length of shaft 304. Shaft 304 may be substantially circular in cross-section, in an embodiment, although it may have other cross-sectional shapes and/or a variety of cross-sectional shapes, in other embodiments.

While being operated in a rotary mode, the aligned, linear-rotary stator windings are adapted to produce magnetic fields that induce a rotational force, in the form of a torque, on shaft 304. This rotational force may cause shaft 304 to rotate about shaft axis 306. In an embodiment, the torque may be produced to impart a clockwise rotational force at certain times, as indicated by arrow 308, and a counter-clockwise rotational force at other times, as indicated by arrow 310. In alternate embodiments, the torque may be produced to impart a clockwise rotational force or a counter-clockwise rotational force, but not both.

While being operated in a linear mode, the aligned, linear-rotary stator windings are adapted to produce magnetic fields that induce a linear force that is parallel with shaft axis 306, which may result in a linear translation of shaft 304 along shaft axis 306. In an embodiment, the linear force may be produced to impart a shaft extension force (e.g., pushing shaft 304 outward with respect to outer casing 302) at certain times, as indicated by arrow 312, and a shaft retraction force at other times (e.g., pulling shaft 304 inward with respect to outer casing 302), as indicated by arrow 314. In alternate embodiments, actuator 300 may be a single-use device, and the linear force may be produced to impart a shaft extension force or a shaft retraction force, but not both. The range of linear translation may be defined by the physical configuration of the rotor and stator, as well as other mechanical features of actuator 300.

In an embodiment, actuator 300 may be operated in the rotary mode or the linear mode, but not both, at any given time. Accordingly, for example, actuator 300 may be sequentially controlled to impart a shaft extension force, then to impart a rotational force (clockwise or counter-clockwise, or both at different times), and then to impart a shaft retraction force. As another example, actuator 300 may be sequentially controlled to impart a rotational force, then to impart a shaft extension force, and then to impart a shaft retraction force. Other examples of non-simultaneous linear and rotary operations may be imagined.

In another embodiment, actuator 300 may be operated simultaneously in the rotary mode and the linear mode, at a given time. Accordingly, for example, actuator 300 may be controlled simultaneously to impart a shaft extension or retraction force along with imparting a rotational force. Simultaneous imparting of a linear force and a rotational force may result in shaft 304 moving in a spiraling motion along and around shaft axis 306.

Shaft 304 may include one or more physical features, which enable shaft 304 to engage with other mechanisms. For example, but not by way of limitation, shaft 304 may have a distal end 316 adapted to push against another mechanism in order to displace or rotate the mechanism. As another example, shaft 304 may have a distal end 316 adapted to engage with another mechanism. For example, shaft 304 and the other mechanism may have complementary gears or other mating apparatus. Alternatively, shaft 304 may be adapted to frictionally engage with another mechanism.

Actuator systems of various embodiments may be incorporated into a number of types of systems. For example, various embodiments of an actuator system may be incorporated into a flight surface control system of an aircraft (e.g., an airplane or missile), a spacecraft (e.g., a launch vehicle or satellite), or a watercraft. An example of an actuator system incorporated into a flight surface control system of an aircraft will now be described.

When incorporated into a flight surface control system of an aircraft, the outer casing 302 of actuator 300 may be rigidly attached to the aircraft frame or wing, and the aircraft frame or wing may include a movable flight control surface. The flight control surface may be adapted to be rotated to redirect air flow. At the onset of a flight control surface rotation process, shaft 304 may be in a retracted position (e.g. pulled into the outer casing 302 to a retraction limit point, such as is illustrated in FIG. 1), and a shaft engagement mechanism at the distal end 316 of shaft 304 may be disengaged from a complementary flight control surface engagement mechanism attached to the flight control surface.

Upon receiving a first control input, actuator 300 may impart one or more shaft extension forces, as described above, to linearly translate shaft 304 some distance along shaft axis 306 in a direction away from outer casing 302. When shaft 304 has reached an extension limit point (or in response to a determination that a desired linear translation has been achieved), the extension of shaft 304 may be considered to be completed (e.g., as is illustrated in FIG. 2). A feedback path may enable a determination whether the desired linear translation has been achieved, in an embodiment. The linear translation may result in engagement between the complementary shaft engagement mechanism and the flight control surface engagement mechanism.

Subsequently (e.g., automatically or upon receiving a second control input), actuator 300 may impart one or more shaft rotational forces to rotate shaft 304 in clockwise and/or counter-clockwise directions, which in turn may cause the flight control surface to rotate. When shaft 304 has rotated a desired angle (or in response to a determination that a desired rotation has been achieved), the rotation of shaft 304 may be considered to be completed. A feedback path (e.g., a same or different feedback path from that described above) may enable a determination whether the desired rotation angle has been achieved, in an embodiment. Then (e.g., automatically or upon receiving a third control input), actuator 300 may impart one or more shaft retraction forces, as described above, to linearly translate shaft 304 some distance along shaft axis 306 in a direction toward outer casing 302. When shaft 304 has reached its retraction limit point (or in response to a determination that the desired linear translation has been achieved), the retraction of shaft 304 and the flight control surface rotation process may be considered to be completed.

In the embodiment described above, the outer casing 302 may be rigidly attached to an aircraft frame or wing, and the shaft 304 may engage with and disengage from a flight control surface. In an alternate embodiment, the outer casing 302 may be rigidly attached to the flight control surface, and the shaft may engage with and disengage from the aircraft frame or wing. Also, as will be explained in more detail later, actuator systems of various embodiments may be incorporated into a number of types of systems other than flight surface control systems of aircraft.

Figure 4:
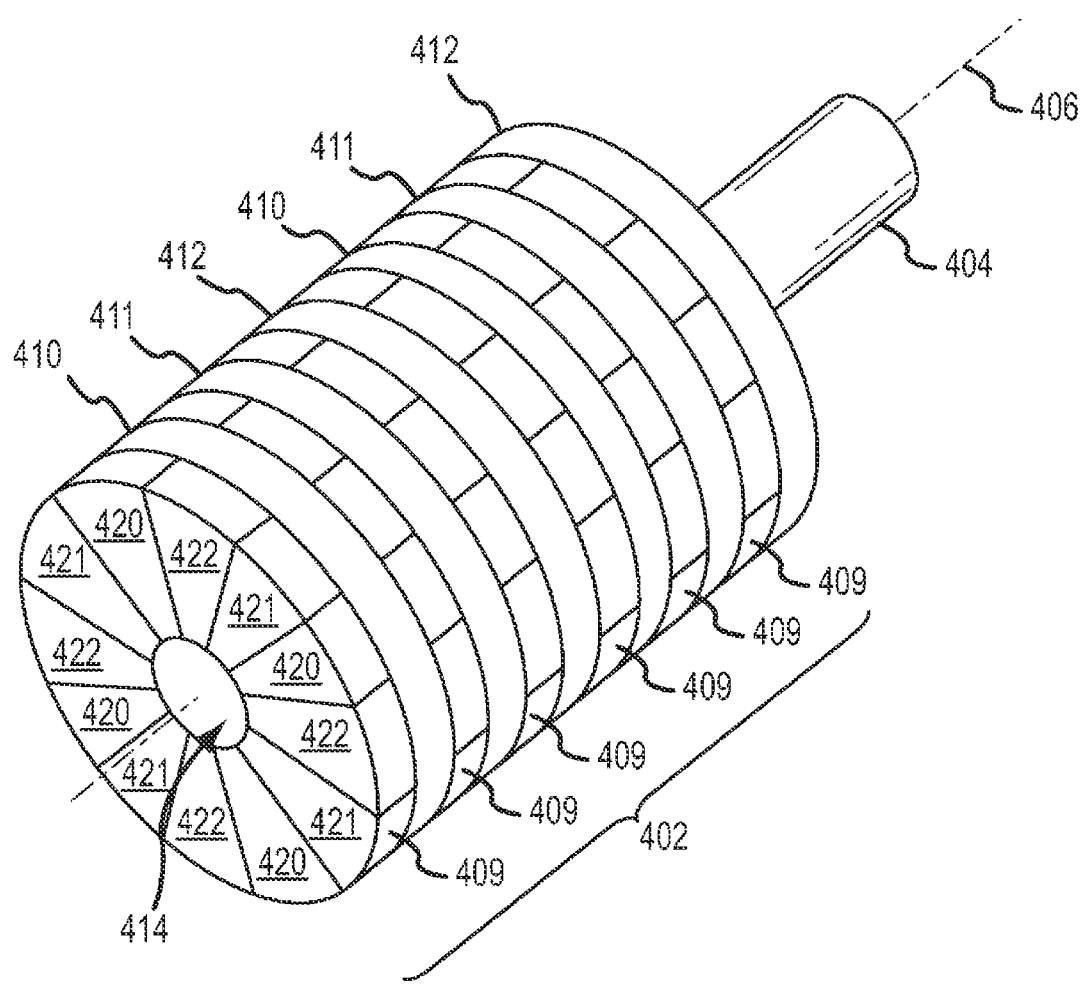
FIG. 4 illustrates a perspective view of a portion of a rotor and a shaft, in accordance with an example embodiment.
Figure 5:
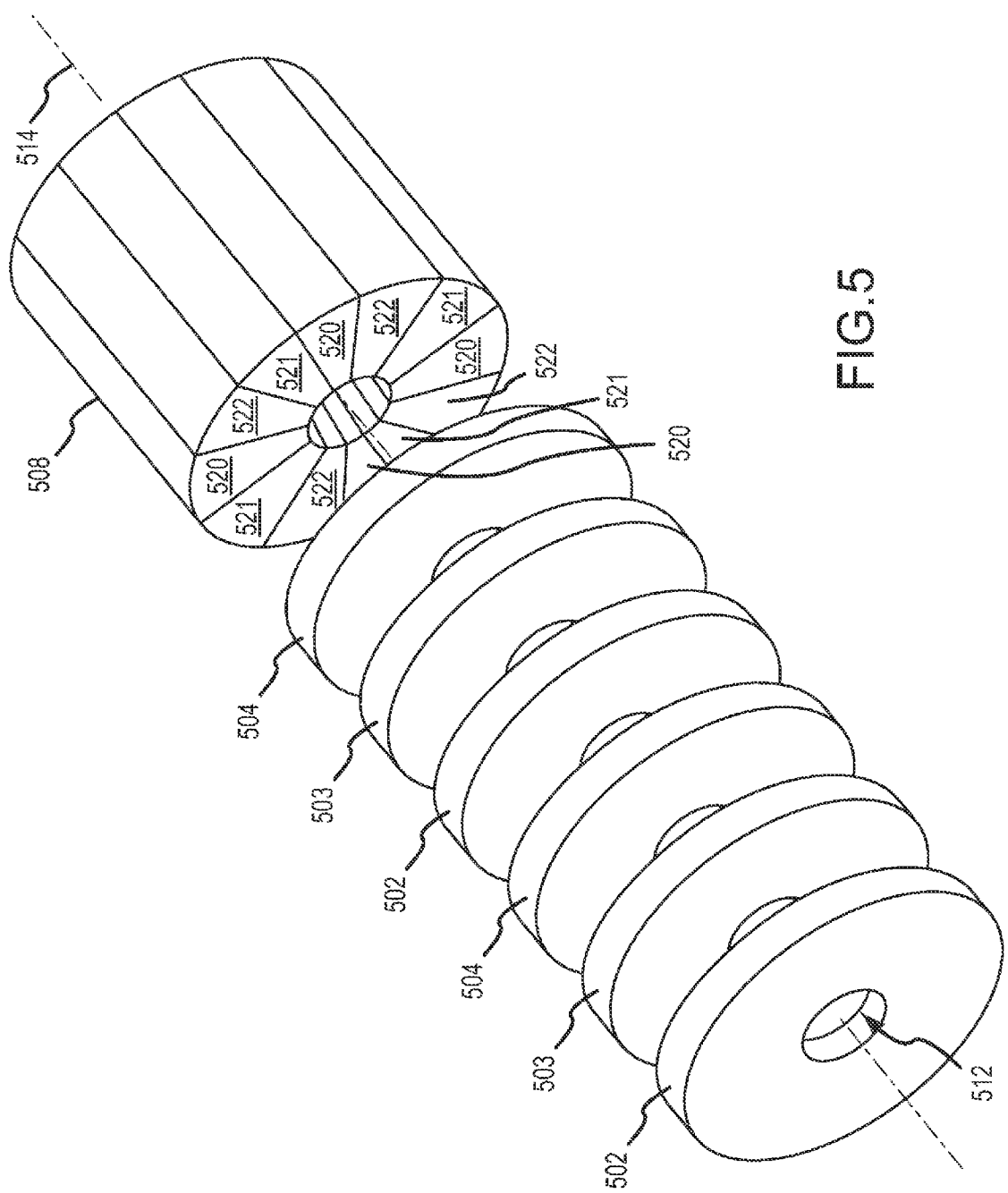
FIG. 5 illustrates a perspective view of a plurality of aligned, linear-rotary stator windings, in accordance with an example embodiment.
Figure 6:
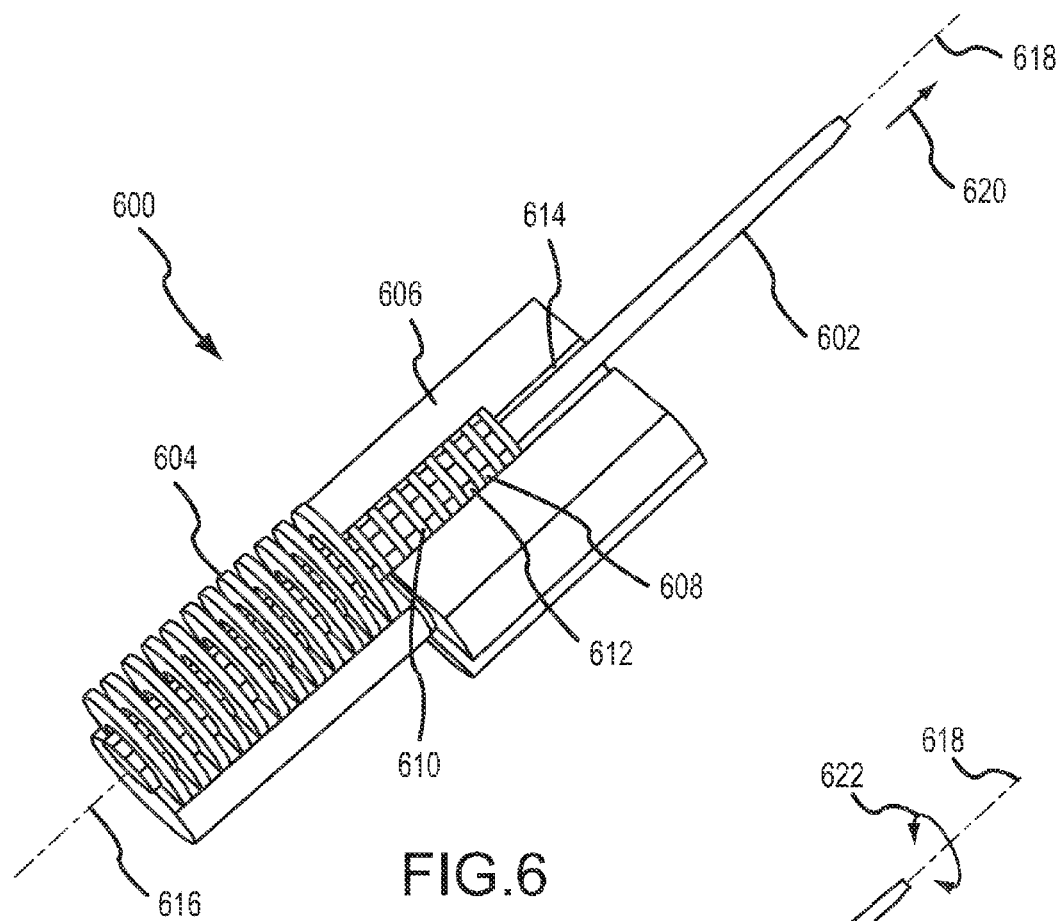
FIG. 6 illustrates a cut-away, perspective view of an aligned, linear-rotary electromechanical actuator with a shaft in a retracted position, in accordance with an example embodiment.
Figure 7:
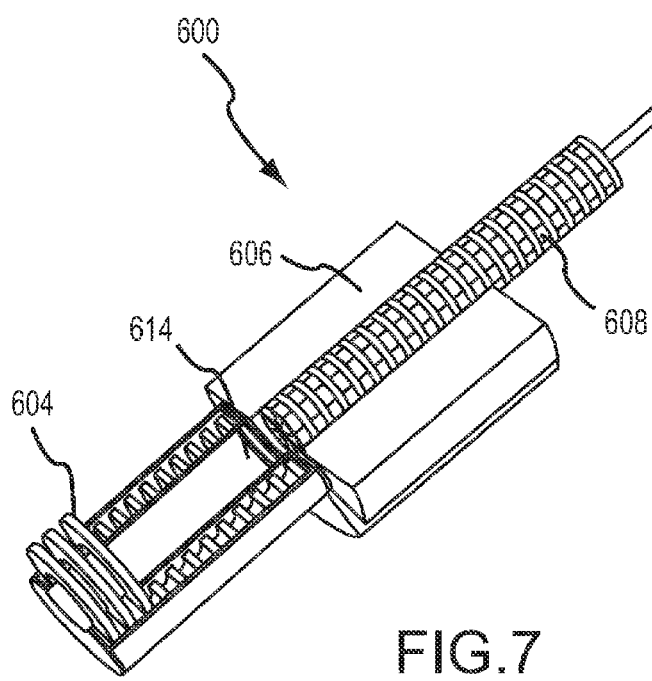
FIG. 7 illustrates the actuator of FIG. 6 with the shaft in an extended position, in accordance with an example embodiment.
Figure 10:
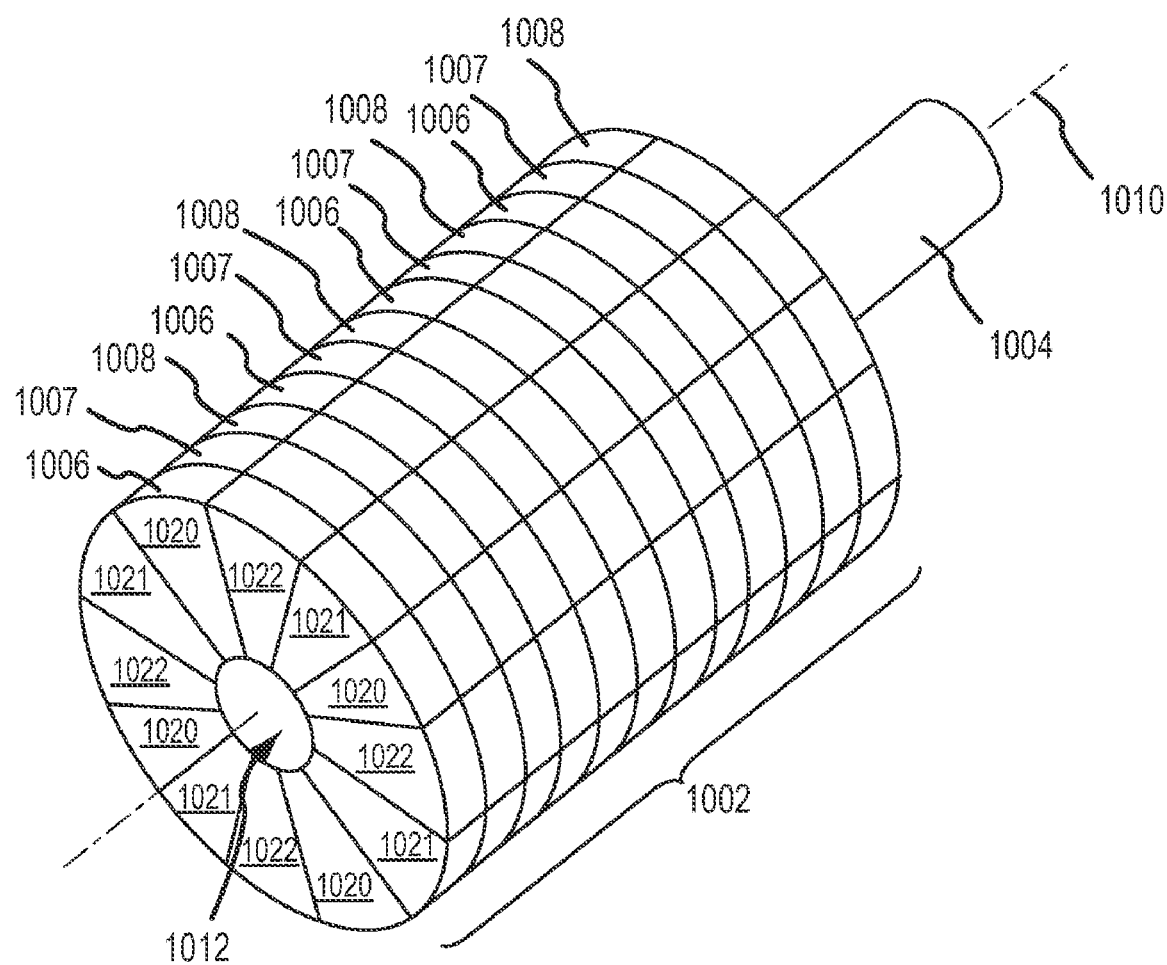
FIG. 10 illustrates a perspective view of a portion of a rotor and a shaft, in accordance with another example embodiment.
Figure 11:
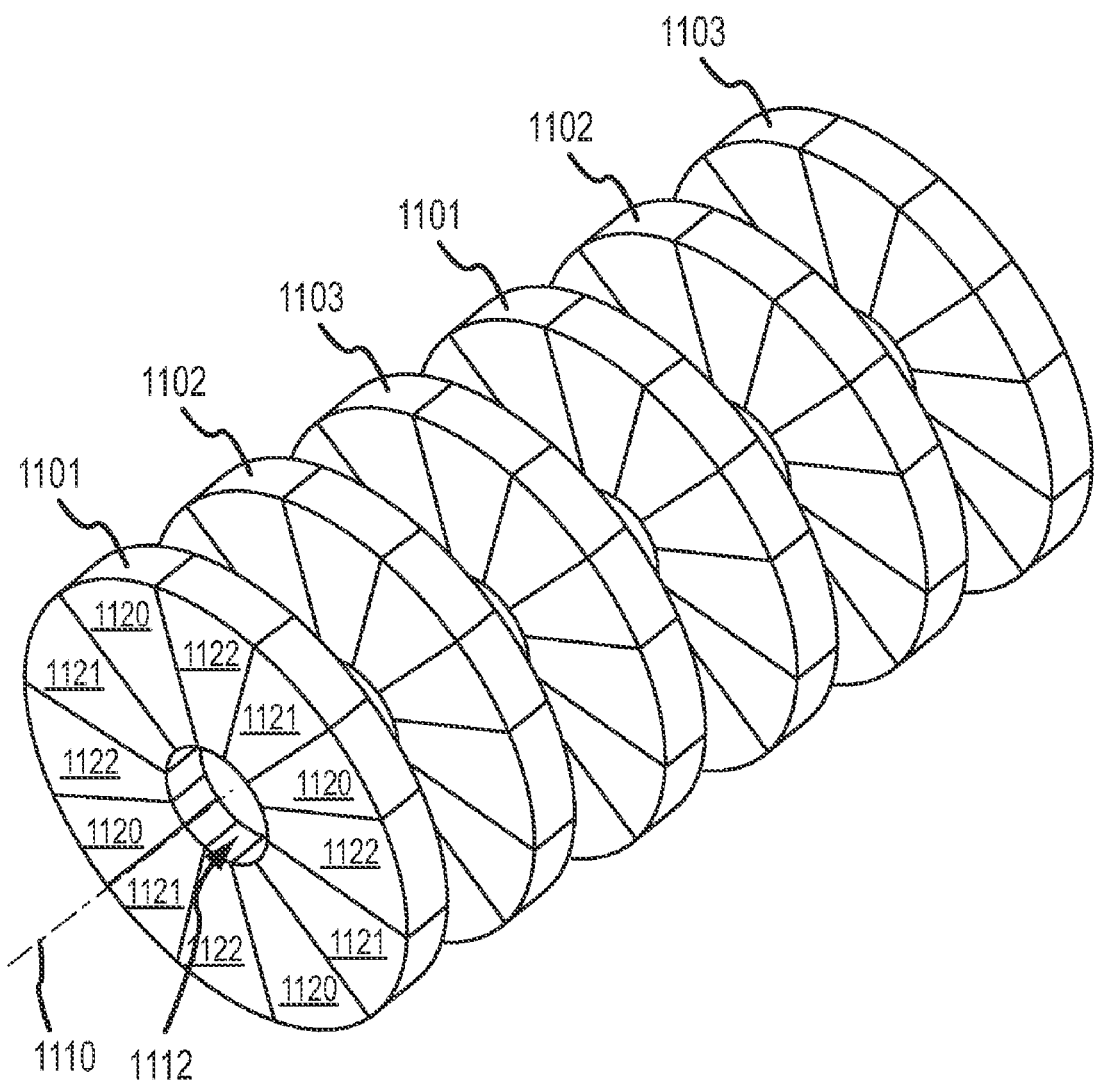
FIG. 11 illustrates a perspective view of a plurality of stator windings, in accordance with another example embodiment.

In FIGS. 4-7, 10, and 11 and the accompanying description, below, embodiments of portions of unassembled actuators will be described, along with illustrating and describing assembled actuators. In particular, FIGS. 4 and 10 illustrate embodiments of rotor and shaft sub-assemblies, FIGS. 5 and 11 illustrate embodiments of stator winding arrangements, and FIGS. 6 and 7 illustrate an embodiment of an assembled actuator having a shaft in a retracted position and an extended position, respectively. Electromagnets or magnetic components illustrated in FIGS. 4-7, 10, and 11 may be formed from conductive windings, as will be described in more detail below. For purposes of ease of illustration, the figures may depict conductive windings as solid discs or disc segments.

FIG. 4 illustrates a perspective view of a portion of a rotor 402 and a shaft 404, in accordance with an example embodiment. As mentioned previously, shaft 404 may be an elongated structure, in an embodiment, and a shaft axis 406 may be defined as an axis substantially through the center of shaft 404 and extending along and beyond the length of shaft 404.

Rotor 402 is coupled to shaft 404, and includes at least one segmented magnetic component 409 and a plurality of non-segmented magnetic components 410, 411, 412, in an embodiment. The segmented and non-segmented magnetic components 409-412 of rotor 402 are adapted to provide first and second rotor magnetic fields which may interact with electrical fields from stator windings (not illustrated) to cause shaft 404 to rotate around shaft axis 406, and/or to translate linearly along shaft axis 406, respectively, as discussed in more detail elsewhere. More specifically, each segmented magnetic component 409 is adapted to provide rotor magnetic fields which may interact with stator magnetic fields produced by the stator windings to cause shaft 404 to rotate around shaft axis 406 (e.g., a shaft torque is produced), and the plurality of non-segmented magnetic components 410-412 are adapted to provide rotor magnetic fields which may interact with stator magnetic fields produced by the stator windings to cause shaft 404 to translate linearly along shaft axis 406.

In an embodiment, each of segmented magnetic components 409 and/or non-segmented magnetic components 410-412 may include one or more electromagnets formed from conductive windings that are wound on a structure attached to shaft 404. In an alternate embodiment, segmented magnetic components 409 and/or non-segmented magnetic components 410-412 may include permanent magnets.

Segmented magnetic components 409 and non-segmented magnetic components 410-412 are arranged along shaft axis 406 in an alternating configuration, in an embodiment. Each of segmented magnetic components 409 and/or non-segmented magnetic components 410-412 may have a central opening 414 adapted to accept shaft 404. Segmented magnetic components 409 and/or non-segmented magnetic components 410-412 may be attached to shaft 404 at the surfaces that define their central openings 414, in an embodiment. In another embodiment, segmented magnetic components 409 and/or non-segmented magnetic components 410-412 may not have central openings 414 adapted to accept shaft 404, and instead an end component (e.g., non-segmented magnetic component 412) may be attached to shaft 404.

Each segmented magnetic component 409 includes multiple winding segments 420, 421, 422, where each of the winding segments 420-422 is included within one of multiple groups of winding segments. Each winding segment 420-422 may carry currents to produce distinct magnetic fields. In FIG. 4, winding segments 420-422 within the same group are designated with the same reference numeral. In an embodiment, each segmented magnetic component 409 includes three groups of winding segments 420-422. In alternate embodiments, a segmented magnetic component may include as few as two groups of winding segments, or more than three groups of winding segments.

In an embodiment, the winding segments 420-422 are arranged in a repeating pattern, around the shaft axis 406, between winding segments 420-422 of each of the multiple groups. In a particular embodiment, the winding segments 420-422 alternate around the shaft axis 406 in a repeating pattern of a first-group winding segment 420, a second-group winding segment 421, a third-group winding segment 422, and so on. In an embodiment, four repetitions of the alternating winding segment pattern are arranged around the shaft axis 406. Accordingly, each segmented magnetic component 409 may include twelve winding segments 420-422. In alternate embodiments, each segmented magnetic component 409 may include more or fewer than four repetitions of the winding segment pattern and/or more or fewer than twelve winding segments.

In an embodiment, the winding segments 420-422 within each group (e.g., winding segments 420) are adapted and electrically coupled to carry currents synchronously, and accordingly, to synchronously produce substantially similar magnetic fields. In an embodiment, each winding segment group is electrically coupled to receive one of three electrical inputs of a three-phase, AC power input (e.g., AC power input 122, FIG. 1). Accordingly, during operation, a cumulative magnetic field produced by a segmented magnetic component 409 effectively rotates around the shaft 404 at a rate that is proportional to the frequency of the power input. When this cumulative, rotating magnetic field interacts with a corresponding magnetic field produced by a rotary stator winding (e.g., rotary stator winding 508, FIG. 5), a rotational force is produced on rotor 402 and shaft 404. This force may instill rotation of the rotor 402 and shaft 404 in either a clockwise or counter-clockwise direction around shaft axis 406, in an embodiment.

In contrast to the segmented magnetic components 409, non-segmented magnetic components 410-412 each are adapted to produce a magnetic field having a single orientation. Each non-segmented magnetic component 410-412 is included within one of multiple groups of non-segmented magnetic components 410-412. In FIG. 4, non-segmented magnetic components 410-412 within the same group are designated with the same reference numeral. In an embodiment, the plurality of non-segmented magnetic components 410-412 includes three groups. In alternate embodiments, a plurality of non-segmented magnetic components may include as few as two groups, or more than three groups.

In an embodiment, the plurality of non-segmented magnetic components 410-412 are arranged in a repeating pattern, along the shaft axis 406, between non-segmented magnetic components 410-412 of each of the multiple groups. In an embodiment, the non-segmented magnetic components 410-412 alternate along the shaft axis 406 in a repeating pattern of a first-group non-segmented magnetic component 410, a second-group non-segmented magnetic component 411, a third-group non-segmented magnetic component 412, and so on. In the illustrated embodiment, each non-segmented magnetic component group includes two non-segmented magnetic components, and two repetitions of the alternating non-segmented magnetic component pattern are arranged along the shaft axis 406. In alternate embodiments, each group of non-segmented magnetic components may include more than two non-segmented magnetic components, and/or the pattern of non-segmented magnetic components may include more or fewer than two repetitions of the non-segmented magnetic component pattern.

In an embodiment, the non-segmented magnetic components 410-412 within each group (e.g., non-segmented magnetic components 410-412) are adapted and electrically coupled to carry currents synchronously and accordingly, to synchronously produce substantially similar magnetic fields. In an embodiment, each non-segmented magnetic component group is electrically coupled to receive one of three electrical inputs of a three-phase, AC power input (e.g., AC power input 122, FIG. 1). Accordingly, during operation, a cumulative magnetic field produced by the non-segmented magnetic components 410-412 effectively translates along the shaft axis 406 at a rate that is proportional to the frequency of the power input. When this cumulative magnetic field interacts with a corresponding magnetic field produced by linear stator windings (e.g., linear stator windings 502-504, FIG. 5), a linear force is produced on rotor 402 and shaft 404. This force may instill translation of the rotor 402 and shaft 404 in either direction along shaft axis 406, in an embodiment.

Although six segmented magnetic components 409 and six non-segmented magnetic components 410-412 are illustrated, a combined rotor 402 may include more or fewer of either or both segmented magnetic components 409 and non-segmented magnetic components 410-412. In addition, although segmented magnetic components 409 and non-segmented magnetic components 410-412 are shown to have opposing faces in direct contact with each other, a space may be present between each set of opposing faces, in an alternate embodiment. In another alternate embodiment, a spacer (not illustrated) and/or one or more other components may be positioned between some or all of the segmented magnetic components 409 and/or non-segmented magnetic components 410-412.

Segmented magnetic components 409 and non-segmented magnetic components 410-412 may be arranged along shaft axis 406 in an alternating pattern (e.g., interleaved), as illustrated in FIG. 4. In the illustrated arrangement, a segmented magnetic component 409 is arranged between each pair of non-segmented magnetic components 410-412, and a non-segmented magnetic component 410-412 is arranged between each pair of segmented magnetic components 409. In other embodiments, more than one segmented magnetic component 409 may be arranged between each pair of non-segmented magnetic components 410-412, and/or more than one non-segmented magnetic component 410-412 may be arranged between each pair of segmented magnetic components 409. In still another alternate embodiment, the multiple segmented magnetic components 409 and the multiple non-segmented magnetic components 410-412 may be arranged along separate portions of the shaft axis 406. In other words, the multiple segmented magnetic components 409 and the multiple non-segmented magnetic components 410-412 may not be interleaved, in another embodiment.

FIG. 5 illustrates a perspective view of a plurality of aligned, linear-rotary stator windings 502, 503, 504, 508, in accordance with an example embodiment. The plurality of aligned, linear-rotary stator windings 502-504, 508 includes an arrangement of multiple linear stator windings 502-504 and at least one rotary stator winding 508 (e.g., one or more rotary stator windings). Linear stator windings 502-504 and rotary stator winding 508 may form portions of a linear stator portion (e.g., linear stator portion 301, FIG. 3) and a rotary stator portion (e.g., rotary stator portion 303, FIG. 3), respectively, of an aligned, linear-rotary electromagnetic actuator, in an embodiment. In an embodiment, each of stator windings 502-504, 508 may include one or more electromagnets formed from conductive windings that are wound on a structure. In an alternate embodiment, some or all of stator windings 502-504, 508 may include permanent magnets.

Each of stator windings 502-504, 508 is configured to define a central opening 512 adapted to receive a rotor and shaft (e.g., rotor 402 and shaft 404, FIG. 4). The central openings 512 of the linear stator windings 502-504 and rotary stator winding 508 are aligned to define a central stator channel parallel to a stator axis 514. The central stator channel is adapted to receive the rotor and shaft, and to permit linear translation of the rotor and shaft at least partially therethrough. As will be described in more detail in conjunction with FIGS. 6 and 7, when the rotor, shaft, and stator windings are assembled, the rotor axis (e.g., axis 406, FIG. 4) is substantially parallel with and/or coincident with the stator axis 514.

In an embodiment, linear stator windings 502-504 are arranged along a first portion of stator axis 514, and their central openings 512 define a first portion of the central stator channel. The rotary stator winding 508 is arranged along a second, adjacent portion of stator axis 514, and its central opening 512 defines a second portion of the central stator channel. In an alternate embodiment, some or all of linear stator windings 502-504 and the rotary stator winding 508 may be arranged along the stator axis 514 in an alternating pattern (e.g., interleaved).

Linear stator windings 502-504 each are adapted to produce a stator magnetic field having a single orientation. Each linear stator winding 502-504 is included within one or multiple groups of linear stator windings 502-504. In FIG. 5, linear stator windings 502-504 within the same group are designated with the same reference numeral. In an embodiment, the plurality of linear stator windings 502-504 includes three groups. In alternate embodiments, a plurality of linear stator windings 502-504 may include as few as two groups, or more than three groups.

In an embodiment, the multiple linear stator windings 502-504 are arranged in a repeating pattern, along the central stator channel (e.g., along stator axis 514), between linear stator windings 502-504 of each of the multiple groups. In an particular embodiment, the linear stator windings 502-504 alternate along the central stator channel in a repeating pattern of a first-group linear stator winding 502, a second-group linear stator winding 503, a third-group linear stator winding 504, and so on. In the illustrated embodiment, each linear stator winding group includes two linear stator windings, and two repetitions of the alternating linear stator winding pattern are arranged along the central stator channel. In alternate embodiments, each group of linear stator windings may include more than two linear stator windings, and/or the pattern of linear stator windings may include more or fewer than two repetitions of the linear stator winding pattern.

In an embodiment, the linear stator windings 502-504 within each group (e.g., linear stator windings 502) are adapted and electrically coupled to carry currents synchronously and accordingly, to synchronously produce substantially similar magnetic fields. In an embodiment, each linear stator winding group is electrically coupled to receive one of three electrical inputs of a three-phase, AC power input (e.g., AC power input 122, FIG. 1). Accordingly, during operation, a cumulative magnetic field produced by the linear stator windings 502-504 effectively translates along the stator axis 514 at a rate that is proportional to the frequency of the power input. As mentioned previously, when this cumulative magnetic field interacts with a corresponding magnetic field produced by non-segmented magnetic components of the rotor (e.g., non-segmented magnetic components 410-412, FIG. 4), a linear force is produced on the rotor and shaft. This force may instill translation of the rotor and shaft in either direction along stator axis 514, in an embodiment.

The at least one rotary stator winding 508 includes multiple winding segments 520, 521, 522, where each of the winding segments 520-522 is included within one of multiple groups of winding segments. Rotary stator winding 508 includes an arrangement of multiple groups of winding segments 520-522, where each winding segment 520-522 may carry currents to produce distinct stator magnetic fields. In FIG. 5, winding segments 520-522 within the same group are designated with the same reference numeral. In an embodiment, rotary stator winding 508 includes three groups of winding segments 520-522. In alternate embodiments, a rotary stator winding may include as few as two groups of winding segments, or more than three groups of winding segments.

In an embodiment, the winding segments 520-522 are arranged in a repeating pattern, around the central stator channel (e.g., around stator axis 514), between winding segments 520-522 of each of the multiple groups. In a particular embodiment, the winding segments 520-522 alternate around the central stator channel in a repeating pattern of a first-group winding segment 520, a second-group winding segment 521, a third-group winding segment 522, and so on. In an embodiment, four repetitions of the alternating winding segment pattern are arranged around the central stator channel. Accordingly, rotary stator winding 508 may include twelve winding segments 520-522. In alternate embodiments, rotary stator winding 508 may include more or fewer than four repetitions of the winding segment pattern and/or more or fewer than twelve winding segments.

In an embodiment, the winding segments 520-522 within each group (e.g., winding segments 520) are adapted and electrically coupled to carry currents synchronously, and accordingly, to synchronously produce substantially similar magnetic fields. In an embodiment, each winding segment group is electrically coupled to receive one of three electrical inputs of a three-phase, AC power input (e.g., AC power input 122, FIG. 1). Accordingly, during operation, a cumulative magnetic field produced by rotary stator winding 508 effectively rotates around the stator axis 514 at a rate that is proportional to the frequency of the power input. As mentioned previously, when this cumulative, rotating magnetic field interacts with a corresponding magnetic field produced by segmented magnetic components on the rotor (e.g., segmented magnetic components 409, FIG. 4), a rotational force is produced on the rotor and shaft. This force may instill rotation in either a clockwise or counter-clockwise direction around the shaft axis, in an embodiment.

Although six linear stator windings 502-504 and one rotary stator winding 508 are illustrated, a stator may include more or fewer linear stator windings 502-504 or more rotary stator windings 508. In addition, in another alternate embodiment, a spacer (not illustrated) and/or one or more other components may be positioned between some or all of the linear stator windings 502-504 and/or the rotary stator winding 508.

FIG. 6 illustrates a cut-away, perspective view of an aligned, linear-rotary electromechanical actuator 600 with a shaft 602 in a retracted position, in accordance with an example embodiment. Aligned, linear-rotary electromechanical actuator 600 includes a stator having a plurality of linear stator windings 604 and at least one rotary stator winding 606. In addition, aligned, linear-rotary electromechanical actuator 600 includes a rotor 608 having a plurality of non-segmented magnetic components 610 and a plurality of segmented magnetic components 612.

When assembled, the rotor 608 and shaft 602 are positioned within a central stator channel 614 defined by central openings of the linear stator windings 604 and the rotary stator winding 606 (shown cut-away). The central openings are adapted to permit rotor 608 and shaft 602 to translate back and forth along stator axis 616, and also to rotate around shaft axis 618. As mentioned previously, stator axis 616 and shaft axis 618 may be substantially parallel and/or substantially coincident.

As FIG. 6 illustrates, at least a portion of rotor 608 is positioned within a portion of the central stator channel 614 defined by the central openings of the linear stator windings 604. Accordingly, in this position, rotor 608 may be considered to be in magnetic proximity to the linear stator windings 604. The linear stator windings 604 may be arranged as described in conjunction with FIG. 5, in an embodiment, and accordingly each linear stator winding 604 may be part of a group of linear stator windings 604.

As mentioned previously, the linear stator windings 604 within each group may be adapted and electrically coupled to carry currents synchronously and accordingly, to synchronously produce substantially similar magnetic fields. In order to induce linear translation of rotor 608 and shaft 602 along stator axis 616, an actuator controller unit (e.g., actuator controller unit 106, FIG. 1) may provide power and/or control inputs (e.g., power inputs 126 and/or actuator control inputs 128, FIG. 1), which cause a cumulative magnetic field produced by the linear stator windings 604 effectively to translate along the stator axis 616 at a rate that is proportional to the frequency of the power input. Additionally, the actuator controller unit may provide power and/or control inputs, which cause a cumulative magnetic field produced by non-segmented magnetic components 610 effectively to translate along the shaft axis 618. When the magnetic fields interact, a linear force may be produced on rotor 608 and shaft 602. This force may instill translation of rotor 608 and shaft 602 along stator axis 616 in a direction indicated generally by arrow 620, in an embodiment. Accordingly, the linear force may move shaft 602 from a retracted position to an extended position.

FIG. 7 illustrates the actuator 600 of FIG. 6 with the shaft 602 in an extended position (with several linear stator windings 604 removed, for purposes of illustration), in accordance with an example embodiment. In the extended position, at least a portion of rotor 608 is positioned within a portion of the central stator channel 614 defined by the central openings of the rotary stator winding 606. Accordingly, in this position, rotor 608 may be considered to be in magnetic proximity to the rotary stator winding 606. The rotary stator winding 606 may be configured as described in conjunction with FIG. 5, in an embodiment, and accordingly the rotary stator winding 606 may include multiple groups of rotary stator winding segments (e.g., winding segments 520-522, FIG. 5).

As mentioned previously, the winding segments within each group may be adapted and electrically coupled to carry currents synchronously and accordingly, to synchronously produce substantially similar magnetic fields. In order to induce rotation of rotor 608 and shaft 602 around shaft axis 618, an actuator controller unit (e.g., actuator controller unit 106, FIG. 1) may provide power and/or control inputs (e.g., power inputs 126 and/or actuator control inputs 128, FIG. 1), which cause a cumulative magnetic field produced by the winding segments effectively to rotate around the stator axis 616 at a rate that is proportional to the frequency of the power input. Additionally, the actuator controller unit may provide power and/or control inputs, which cause a cumulative magnetic field produced by segmented magnetic components 612 effectively to rotate around the shaft axis 618. When the magnetic fields interact, a rotational force may be produced on rotor 608 and shaft 602. This force may instill rotation of rotor 608 and shaft 602 around shaft axis 618 in a clockwise or counter-clockwise direction, as indicated by arrow 622, in an embodiment.

FIG. 8 illustrates a flowchart of a method for achieving linear translation of a rotor and shaft (e.g., rotor 604 and shaft 602, FIG. 6), in accordance with an example embodiment. Implementation of embodiments of the method may result in translation of a rotor and shaft in either direction along a shaft axis.

The method may begin, in block 802, when a control input (e.g., actuator control input 124, FIG. 1) is received, which specifies a desired linear translation of the rotor and shaft. The control input may or may not indicate any or all of a translation distance, a direction, an ending position, a rate, a duration, a start time, and/or a stop time, in various embodiments. For example, such a control input may be produced by a control input source (e.g., an aircraft flight surface control system or other control system) and received by an actuator controller unit (e.g., actuator controller unit 106, FIG. 1), as mentioned earlier.

In block 804, one or more actuator inputs (e.g., power inputs 126 and actuator control inputs 128, FIG. 1) are provided, based on the control inputs, to the linear stator windings. As discussed previously, these actuator inputs may result in the production of a magnetic field in the stator, which translates along the stator axis. Simultaneously, in block 806, one or more actuator inputs may be provided, based on the control inputs, to the non-segmented magnetic components of the rotor. As also discussed previously, these actuator inputs may result in the production of a magnetic field in the rotor, which translates along the shaft axis. The translating magnetic field in the stator and the translating magnetic field in the rotor may interact to produce a linear force on the rotor and shaft. This linear force may produce translation of the rotor and shaft.

In block 808, a determination may be made whether a desired translation has been achieved. In an embodiment, this may include the actuator controller unit receiving feedback signals (e.g., feedback signals 130, FIG. 1) from the actuator, which indicate various characteristics regarding the actual translation. These characteristics may include, for example, translation distance, direction, position, and/or rate. The feedback signals may be evaluated to determine whether the actual translation is occurring as was specified in the corresponding control input, and/or whether the desired translation (e.g., distance or ending position) has been achieved. If not, then the method may iterate as shown, by providing additional actuator inputs to the linear stator windings and/or the non-segmented magnetic components, until the desired translation is achieved. When the desired translation has been achieved, the method may end.

FIG. 9 illustrates a flowchart of a method for achieving rotation of a rotor and shaft (e.g., rotor 604 and shaft 602, FIG. 6), in accordance with an example embodiment. Implementation of embodiments of the method may result in rotation of a rotor and shaft in either a clockwise or counter-clockwise direction around a shaft axis.

The method may begin, in block 902, when a control input (e.g., actuator control input 124, FIG. 1) is received, which specifies a desired rotation of the rotor and shaft. The control input may or may not indicate any or all of a rotation angle, a direction, an ending position (or angle), a rate, a duration, a start time, and/or a stop time, in various embodiments. For example, such a control input may be produced by a control input source (e.g., an aircraft flight surface control system or other control system) and received by an actuator controller unit (e.g., actuator controller unit 106, FIG. 1), as mentioned earlier.

In block 904, one or more actuator inputs (e.g., power inputs 126 and actuator control inputs 128, FIG. 1) are provided, based on the control inputs, to the rotary stator windings. As discussed previously, these actuator inputs may result in the production of a magnetic field in the stator, which rotates around the stator axis. Simultaneously, in block 906, one or more actuator inputs are provided, based on the control inputs, to the segmented magnetic components of the rotor. As also discussed previously, these actuator inputs may result in the production of a magnetic field in the rotor, which rotates around the shaft axis. The rotating magnetic field in the stator and the rotating magnetic field in the rotor may interact to produce a rotational force on the rotor and shaft. This rotational force may produce rotation of the rotor and shaft.

In block 908, a determination may be made whether a desired rotation has been achieved. In an embodiment, this may include the actuator controller unit receiving feedback signals (e.g., feedback signals 130, FIG. 1) from the actuator, which indicate various characteristics regarding the actual rotation. These characteristics may include, for example, rotation angle, direction, angular position, and/or rate. The feedback signals may be evaluated to determine whether the actual rotation is occurring as was specified in the corresponding control input, and/or whether the desired rotation (e.g., angle or ending position) has been achieved. If not, then the method may iterate as shown, by providing additional actuator inputs to the rotary stator windings and/or the segmented magnetic components, until the desired rotation is achieved. When the desired rotation has been achieved, the method may end.

Embodiments of the methods of FIGS. 8 and 9 may be performed sequentially, in any order. In other words, a shaft may be first translated one or more times, then rotated one or more times, again translated one or more times, again rotated one or more times, and so on. Alternatively, a shaft may be first rotated one or more times, then translated one or more times, again rotated one or more times, again translated one or more times, and so on. Alternatively, embodiments of the methods of FIGS. 8 and 9 may be performed simultaneously. In other words, a shaft may simultaneously be rotated and translated.

In various embodiments described above, rotary stator windings and segmented magnetic components may be adapted to produce rotating magnetic fields when they receive phased power inputs and/or control inputs. As will be illustrated and described in conjunction with FIGS. 10-12, rotary stator windings and segmented magnetic components also may be adapted to produce translating magnetic fields when the receive different power inputs and/or control inputs. Accordingly, in other embodiments of an aligned, linear-rotary electromagnetic actuator, some or all of the linear stator windings and/or non-segmented magnetic components may be replaced by dual-controlled rotary stator windings and/or segmented magnetic components.

FIG. 10 illustrates a perspective view of a portion of a rotor 1002 and a shaft 1004, in accordance with another example embodiment. Rotor 1002 is coupled to shaft 1004, and includes a plurality of segmented magnetic components 1006, 1007, 1008, in an embodiment. The segmented magnetic components 1006-1008 of rotor 1002 are adapted to provide magnetic fields which may interact with electrical fields from stator windings (not illustrated) to cause shaft 1004 to rotate around shaft axis 1010, and/or to translate linearly along shaft axis 1010, as discussed in more detail below.

In an embodiment, each of segmented magnetic components 1006-1008 may include one or more electromagnets formed from conductive windings that are wound on a structure attached to shaft 1004. In an alternate embodiment, segmented magnetic components 1006-1008 may include permanent magnets. Each of segmented magnetic components 1006-1008 may have a central opening 1012 adapted to accept shaft 1004. Segmented magnetic components 1006-1008 may be attached to shaft 1004 at the surfaces that define their central openings 1012, in an embodiment. In another embodiment, segmented magnetic components 1006-1008 may not have central openings 1012 adapted to accept shaft 1004, and instead an end component may be attached to shaft 1004.

As discussed in detail in conjunction with FIG. 4, each segmented magnetic component 1006-1008 may include an arrangement of multiple groups of winding segments 1020, 1021, 1022, where each winding segment 1020-1022 may carry currents to produce distinct magnetic fields. In FIG. 10, winding segments 1020-1022 within the same group are designated with the same reference numeral. Various embodiments of winding segments, numbers of winding segments per segmented magnetic component, winding segment groups, numbers of windings segments in each group, patterns, and pattern repetitions are discussed in conjunction with FIG. 4, and those embodiments are similarly applicable to the segmented magnetic components 1006-1008 illustrated in FIG. 10. In addition, embodiments discussed in conjunction with FIG. 4 relating to electrical coupling of the winding segments, synchronous production of magnetic fields, power inputs to produce a rotating magnetic field around a shaft, and interaction of the rotating magnetic field with stator windings to produce a rotational force on a rotor and shaft also are applicable to the segmented magnetic components 1006-1008 illustrated in FIG. 10.

When groups of winding segments 1020-1022 carry out-of-phase currents, they may produce a rotating magnetic field, as discussed previously. Operation in this manner is referred to as operation in "rotary mode." As will be explained below, some or all groups of winding segments 1020-1022 may carry DC or in-phase currents that may result in the production of a linearly translating magnetic field. Operation in this manner is referred to as operation in "linear translation mode."

In contrast to the embodiment illustrated in FIG. 4, the rotor 1002 of FIG. 10 excludes non-segmented magnetic components (e.g., non-segmented magnetic components 410-412, FIG. 4). Instead, some or all of the segmented magnetic components 1006-1008 are further adapted to receive power and/or control inputs that result in the production of a magnetic field having a single orientation. For a selected segmented magnetic component (e.g., segmented magnetic component 1006), this may be achieved by producing DC or in-phase, AC currents simultaneously through selected ones or all winding segments 1020-1022 of the segmented magnetic component, while refraining from producing other, out-of phase currents through the winding segments 1020-1022. In this manner, a segmented magnetic component 1006-1008 may have magnetic characteristics substantially similar to the magnetic characteristics of non-segmented magnetic components (e.g., non-segmented magnetic components 410-412).

In an embodiment, during operation, the segmented magnetic components 1006-1008 may be controlled either to produce a rotating magnetic field, to produce a translating magnetic field or simultaneously to produce both rotating and translating magnetic fields. To produce a rotating magnetic field, power and/or control inputs may be provided to one or more segmented magnetic components 1006-1008 as has been described in detail previously. To produce a translating magnetic field, groups of segmented magnetic components 1006-1008 may be designated along a length of shaft 1004. In FIG. 10, segmented magnetic components 1006-1008 within the same group are designated with the same reference numeral. In an embodiment, the plurality of segmented magnetic components 1006-1008 includes three groups. In alternate embodiments, a plurality of segmented magnetic components may include as few as two groups, or more than three groups.

In an embodiment, the segmented magnetic components 1006-1008 within each group (e.g., segmented magnetic components 1006) are adapted and electrically coupled to carry currents synchronously and simultaneously through selected ones or all winding segments 1020-1022, and accordingly, to synchronously produce substantially similar magnetic fields. In an embodiment, each segmented magnetic component group is electrically coupled to receive one of three electrical inputs of a three-phase, AC power input (e.g., AC power input 122, FIG. 1). Accordingly, during operation, a cumulative magnetic field produced by the segmented magnetic components 1020-1022 effectively translates along the shaft 1004 at a rate that is proportional to the frequency of the power input. When this cumulative magnetic field interacts with a corresponding magnetic field produced by stator windings (e.g., linear stator windings 502-504, FIG. 5 or stator windings 1101-1103, FIG. 11), a linear force may be produced on rotor 1002 and shaft 1004. This force may instill translation of the rotor 1002 and shaft 1004 in either direction along shaft axis 1010, in an embodiment.

At times, some or all segmented magnetic components 1020-1022 may be operated in linear translation mode. At other times, the same or different segmented magnetic components 1020-1022 may be operated in rotary mode. At still other times, some segmented magnetic components 1020-1022 may be operated in linear translation mode while other segmented magnetic components 1020-1022 may be operated in rotary mode. Accordingly, in an embodiment, an actuator system, which incorporates embodiments of a rotor 1002 and shaft 1004 such as those discussed in conjunction with FIG. 10, may further include one or more physical or logical switches, which are adapted to switch between providing currents to the segmented magnetic components 1020-1022 that produce rotating magnetic fields and providing currents to the segmented magnetic components 1020-1022 that produce linearly translating magnetic fields.

Although twelve segmented magnetic components 1006-1008 are illustrated, a rotor 1002 may include more or fewer segmented magnetic components 1006-1008. In addition, although segmented magnetic components 1006-1008 are shown to have opposing faces in direct contact with each other, a space may be present between each set of opposing faces, in an alternate embodiment. In another alternate embodiment, a spacer (not illustrated) and/or one or more other components may be positioned between some or all of the segmented magnetic components 1006-1008.

FIG. 11 illustrates a perspective view of a plurality of aligned, linear-rotary stator windings 1101, 1102, 1103, in accordance with another example embodiment. The plurality of stator windings 1101-1103 may be provided within a stator portion of an aligned, linear-rotary electromagnetic actuator, in an embodiment. The stator windings 1101-1103 are adapted to provide magnetic fields which may interact with electrical fields from magnetic components on a rotor (not illustrated) to cause the rotor and shaft to rotate around a stator axis 1110, and/or to translate linearly along stator axis 1110, as discussed in more detail below.

In an embodiment, each of the plurality of stator windings 1101-1103 is a segmented stator winding, such as the rotary stator winding 508 discussed in detail in conjunction with FIG. 5. Accordingly, each stator winding 1101-1103 may include one or more electromagnets formed from conductive windings that are wound on a structure. In an alternate embodiment, some or all of stator windings 1101-1103 may include permanent magnets.

Each of stator windings 1101-1103 is configured to define a central opening 1112 adapted to receive a rotor and shaft (e.g., rotor 402 and shaft 404, FIG. 4 or rotor 1002 and shaft 1004, FIG. 10). The central openings 1112 of the stator windings 1101-1103 are aligned to define a central stator channel along a stator axis 1110. The central stator channel is adapted to receive the rotor and shaft, and to permit linear translation of the rotor and shaft at least partially therethrough.

As discussed in detail in conjunction with FIG. 5, a stator winding 1101-1103 may include an arrangement of multiple groups of winding segments 1120, 1121, 1122, where each winding segment 1120-1122 may carry currents to produce distinct magnetic fields. In FIG. 10, winding segments 1120-1122 within the same group are designated with the same reference numeral. Various embodiments of winding segments, numbers of winding segments per rotary stator winding, winding segment groups, numbers of windings segments in each group, patterns, and pattern repetitions are discussed in conjunction with FIG. 5, and those embodiments are similarly applicable to the stator windings 1101-1103 illustrated in FIG. 11. In addition, embodiments discussed in conjunction with FIG. 5 relating to electrical coupling of the winding segments, synchronous production of magnetic fields, power inputs to produce a rotating magnetic field around a stator axis, and interaction of the rotating magnetic field with rotor magnetic components to produce a rotational force on a rotor and shaft also are applicable to the stator windings 1101-1103 illustrated in FIG. 11.

When groups of winding segments 1120-1122 carry out-of-phase currents, they may produce a rotating magnetic field, as discussed previously. Similar to the winding segments for the segmented magnetic components 1020-1022 of FIG. 10, some or all groups of winding segments 1120-1122 may carry DC or in-phase currents that may result in the production of a linearly translating magnetic field.

In contrast to the embodiment illustrated in FIG. 5, the stator windings 1101-1103 of FIG. 11 exclude linear stator windings (e.g., linear stator windings 502-504, FIG. 5). Instead, some or all of the stator windings 1101-1103 are further adapted to receive power and/or control inputs that result in the production of a magnetic field having a single orientation. For a selected stator winding (e.g., stator winding 1101), this may be achieved by producing DC or in-phase, AC currents simultaneously through selected ones or all winding segments 1120-1122 of the stator winding, while refraining from producing other, out-of phase currents through the winding segments 1120-1122. In this manner, a stator winding 1101-1103 may have magnetic characteristics substantially similar to the magnetic characteristics of linear stator windings (e.g., linear stator windings 502-504, FIG. 5).

In an embodiment, during operation, the stator windings 1101-1103 may be controlled either to produce a rotating magnetic field, to produce a translating magnetic field or simultaneously to produce both rotating and translating magnetic fields. To produce a rotating magnetic field, power and/or control inputs may be provided to one or more stator windings 1101-1103 as has been described in detail previously. To produce a translating magnetic field, groups of stator windings 1101-1103 may be designated. In FIG. 11, stator windings 1101-1103 within the same group are designated with the same reference numeral. In an embodiment, the plurality of stator windings 1101-1103 includes three groups. In alternate embodiments, a plurality of stator windings may include as few as two groups, or more than three groups.

In an embodiment, the stator windings 1101-1103 within each group (e.g., stator windings 1101) are adapted and electrically coupled to carry currents synchronously and simultaneously through selected ones or all winding segments 1120-1122, and accordingly, to synchronously produce substantially similar magnetic fields. In an embodiment, each stator winding group is electrically coupled to receive one of three electrical inputs of a three-phase, AC power input (e.g., AC power input 122, FIG. 1). Accordingly, during operation, a cumulative magnetic field produced by the stator windings 1101-1103 effectively translates along the stator axis 1110 at a rate that is proportional to the frequency of the power input. When this cumulative magnetic field interacts with a corresponding magnetic field produced by magnetic components of the rotor (e.g., non-segmented magnetic components 410-412, FIG. 4 or segmented magnetic components 1006-1008, FIG. 10), a linear force may be produced on the rotor and shaft. This force may instill translation of the rotor and shaft in either direction along stator axis 1110, in an embodiment.

At times, some or all stator windings 1101-1103 may be operated in linear translation mode. At other times, the same or different stator windings 1101-1103 may be operated in rotary mode. At still other times, some stator windings 1101-1103 may be operated in linear translation mode while other stator windings 1101-1103 may be operated in rotary mode. Accordingly, in an embodiment, an actuator system, which incorporates embodiments of stator windings 1101-1103 such as those discussed in conjunction with FIG. 11, may further include one or more physical or logical switches, which are adapted to switch between providing currents to the stator windings 1101-1103 that produce rotating magnetic fields and providing currents to the stator windings 1101-1103 that produce linearly translating magnetic fields. Although six stator windings 1101-1103 are illustrated, a stator may include more or fewer stator windings 1101-1103.

Various embodiments of actuators, actuator systems, and methods for controlling actuators have been described herein. In a particular embodiment, an actuator includes a plurality of stator windings adapted to produce a first stator magnetic field that translates along a stator axis, and to produce a second stator magnetic field that rotates around the stator axis, where the plurality of stator windings are aligned to define a central stator channel. In addition, the actuator includes a shaft defining a shaft axis, and a rotor, coupled to the shaft and positioned within the central stator channel, which is adapted to produce a first rotor magnetic field that translates along the shaft axis and to produce a second rotor magnetic field that rotates around the shaft axis. An embodiment of an actuator system includes an actuator and an actuator controller unit, which is adapted to produce actuator inputs. An embodiment of a method for controlling an actuator includes providing first actuator inputs to produce a first translating magnetic field in the stator and a second translating magnetic field in the rotor, and providing second actuator inputs to produce a first rotating magnetic field in the stator and a second rotating magnetic field in the rotor.

Embodiments of the inventive subject matter may be incorporated into any of a number of types of systems that may benefit from an actuator having capabilities and characteristics of the actuators described herein. For example, embodiments of the inventive subject matter may be incorporated into systems that may benefit from the ability of engaging with and rotating one or more system components using an actuator that may provide linear translation and rotation of a shaft. For example, but not by way of limitation, embodiments may be incorporated into flight surface control systems for aircraft, missiles, and spacecraft, watercraft surface control systems, power tools (e.g., drills), doors, gates (e.g., fence gates and/or truck gates), automobile starter motors, and virtually any other application in which rotation and engagement (or disengagement) between an actuator and another system component are desired. Further, actuators according to various embodiments may have a range of dimensions, which may make them suitable for a wide variety of applications. For example, actuators may be produced having lengths (e.g., along a shaft axis) ranging from 10 centimeters (or less) to two meters (or more), for different applications.

Embodiments of the inventive subject matter may provide certain advantages over traditional systems. For example, the actuator embodiments function as a combined linear actuator and rotary motor. As a single component, certain weight savings and part count reductions may be achieved over traditional systems that employ a rotary motor and a separate linear actuator. In addition, an actuator embodiment may consume reduced volume, when compared to the volume consumed by a linear actuator and a rotary motor. Accordingly, actuator embodiments may provide the functionality of a rotary motor and a linear actuator at potentially reduced weight, volume, part count, and/or cost when compared to traditional systems.

While at least one exemplary embodiment has been presented in the foregoing detailed description, it should be appreciated that a vast number of variations exist. For example, embodiments described herein pertain to systems in which a shaft is linearly translated to engage another system component, and then to rotate to provide rotation of all or portions of the component. In other embodiments, an actuator may be adapted to disengage from another system component, and then to provide for rotation of the shaft. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. An actuator comprising:
a plurality of stator windings adapted to produce a first stator magnetic field that translates along a stator axis, and to produce a second stator magnetic field that rotates around the stator axis, wherein the plurality of stator windings are aligned to encompass and define a central stator channel;
a shaft defining a shaft axis; and
a rotor, coupled to the shaft and positioned within the central stator channel, wherein the rotor comprises a plurality of non-segmented magnetic components and a plurality of segmented magnetic components arranged along the shaft axis according to a contiguous alternating pattern, wherein the plurality of non-segmented magnetic components is adapted to produce a first rotor magnetic field that translates along the shaft axis,. and wherein the plurality of segmented magnetic components is further arranged around the shaft axis according to a pattern of multiple repeating groups and is adapted to produce a second rotor magnetic field that rotates around the shaft axis.

2. The actuator of claim 1, wherein the plurality of stator windings comprise:
first stator windings adapted to produce the first stator magnetic field; and
second stator windings adapted to produce the second stator magnetic field.

3. The actuator of claim 2, wherein the first stator windings comprise:
multiple linear stator windings, wherein each of the multiple linear stator windings is included within one of multiple groups of linear stator windings, and wherein the multiple linear stator windings are arranged in a repeating pattern, along the central stator channel, between linear stator windings of each of the multiple groups.

4. The actuator of claim 2, wherein the second stator windings comprise:
at least one rotary stator winding that includes multiple winding segments, wherein each of the multiple winding segments is included within one of multiple groups of winding segments, and wherein the winding segments are arranged in a repeating pattern, around the central stator channel, between winding segments of each of the multiple groups.

5. The actuator of claim 2, further comprising:
an outer casing within which the first stator windings and the second stator windings are contained.

6. The actuator of claim 5, wherein the first stator windings are contained within a linear stator portion of the outer casing, and wherein the second stator windings are contained within a rotary stator portion of the outer casing, which is adjacent to the linear stator portion.

7. The actuator of claim 6, wherein the outer casing includes an aperture proximate to an end of the rotary stator portion, and through which the shaft extends.

8. The actuator of claim 6, wherein the outer casing includes an aperture proximate to an end of the linear stator portion, and through which the shaft extends.

9. The actuator of claim 1, wherein:
each of the plurality of stator windings comprise multiple winding segments, wherein each of the multiple winding segments is included within one of multiple groups of winding segments, and wherein the winding segments are arranged in a first repeating pattern, around the central stator channel, between winding segments of each of the multiple groups of winding segments, and wherein
each of the plurality of stator windings is included within one of multiple groups of stator windings, and wherein the plurality of stator windings are arranged in a second repeating pattern, along the central stator channel, between stator windings of each of the multiple groups of stator windings, and wherein
the plurality of stator windings are controllable to produce the first stator magnetic field that translates along the stator axis, and to produce the second stator magnetic field that rotates around the stator axis.

10. The actuator of claim 1, wherein each of the plurality of non-segmented magnetic components is included within one of multiple groups of non-segmented magnetic components, and wherein the plurality of non-segmented magnetic components are arranged in a repeating pattern, along the shaft axis, between non-segmented magnetic components of each of the multiple groups.

11. A system comprising:
an actuator controller unit adapted to produce actuator inputs; and
an actuator adapted to rotate and translate a shaft in response to the actuator inputs, wherein the actuator includes
a plurality of stator windings adapted to produce a first stator magnetic field that translates along a stator axis, and to produce a second stator magnetic field that rotates around the stator axis, wherein the plurality of stator windings are aligned to encompass and define a central stator channel,
the shaft defining a shaft axis, and
a rotor, coupled to the shaft and positioned within the central stator channel, wherein the rotor comprises a plurality of non-segmented magnetic components and a plurality of segmented magnetic components arranged along the shaft axis according to a contiguous alternating pattern, wherein the plurality of non-segmented magnetic components is adapted to produce a first rotor magnetic field that translates along the shaft axis, and wherein the plurality of segmented magnetic components is further arranged around the shaft axis according to a pattern of multiple repeating groups and is adapted to produce a second rotor magnetic field that rotates around the shaft axis.

12. The system of claim 11, wherein the system further comprises:
a component adapted to engage with the shaft, when the shaft is in an extended position, and to be rotated by the shaft, when the shaft is rotated.

13. The system of claim 12, wherein the component is a component selected from a group of components that includes a surface, a flight control surface, a rudder, a door, a gate, a gear, fan blade, a turbine, a mixer, a drill bit, a driver, and other components adapted to be engaged with and rotated.

* * * * *